Patented Dec. 12, 1939

2,183,342

UNITED STATES PATENT OFFICE 2,183,342

PLASTICIZING RUBBER

Ira Williams, Woodstown, and Carroll Cummings Smith, Carneys Point, N. J., assignors to E. I. du Pont de Nemours & Company, Wilmington, Del., a corporation of Delaware No Drawing. Application September 21, 1937, Serial No. 164,874

8 Claims. (Cl. 260—761)

This invention relates to rubber and more especially to methods of treating rubber to produce a more plastic product.

It is well known that rubber when subjected to mechanical working, such as is obtained by the use of a rubber mill, and especially in the presence of oxygen, is rendered much more plastic. The degree of plasticizing is determined to a great extent by the temperature and time of milling. When milled for a sufficient length of time, rubber will become very soft and at the same time will lose much of its ability to vulcanize. In order to reduce the time of milling and to prevent the deteriorating action of continued milling, it is common practice to add to the rubber, during the milling operation, certain materials which assist in producing softness.

The materials which are commonly used are oils, esters, waxes, fats, alcohols, acids, resins, etc., which assist the production of soft rubber either by a swelling action on the rubber or by acting as a lubricant. Some of the more common softeners are mineral oil, pine tar, palm oil, rosin oil, dibutyl phthalate, paraffin, glycerine, lauryl alcohol and stearic acid. It is also known that certain chemicals, such as diphenyl guanidine, have a slight softening action on the rubber, while other products, such as benzidine, have a considerable stiffening action.

H. L. Fisher in Patent 2,035,698, discloses the preparation of a highly tacky rubber by treating the rubber with from 2 to 5 parts of a nitroso compound, one of which is nitroso-beta-naphthol, and heating at high temperatures. This treatment causes a chemical reaction to take place between the rubber and the nitroso compound whereby a rubber derivative is apparently produced. This product has a high tack which is permanent. It is designed for use where an adhesive material is desired. While the product, obtained by the use of alpha-nitroso-beta-naphthol in the absence of neutralizing agents, is very soft, its high tack is objectionable for many purposes such as the manufacture of most rubber articles and is difficult to handle in such manufacture.

An object of the present invention is to provide a method of treating rubber whereby the rubber will be rendered more plastic without materially increasing the original tack of the rubber. A further object is to provide new plasticizing agents for unvulcanized rubber. A still further object is to provide rubber compositions of greater plasticity but of relatively low tack. Another object is to provide cements of greater rubber content and less viscosity and methods for making the same. Other objects are to provide new compositions of matter and to advance the art. Still other objects will appear hereinafter.

These objects are accomplished in accordance with the present invention when rubber is subjected to the action of alpha-nitroso-beta-naphthol. Aromatic nitroso compounds, in which the nitroso group is directly connected to carbon, have been used in rubber for various purposes. Para-nitroso-dimethyl-aniline has been used commercially as an accelerator of vulcanization. Nitroso benzene has been used by Peachey, J. Soc. Chem. Ind. 36, 424 (1917) as an accelerator and by Staudinger and Joseph, Ber. 63, 2888 (1930) as a reagent for studying the composition of rubber. Fuller, U. S. Patent 1,573,928, has used the alkali and alkaline earth salts of nitroso-beta-naphthol as antioxidants.

Rubber, in order to be plasticized, must be subjected to a suitable chemical attack. In the case of plasticizing by milling, the rubber reacts chemically with oxygen and the effect can be increased by the action of such materials as phenyl-hydrazine. Alpha-nitroso-beta-naphthol, however, can attack the rubber directly before attack by oxygen, and for this reason is more effective, especially on unmilled rubber, such as smoked sheets or the rubber contained in rubber latex.

Rubber, to which alpha-nitroso-beta-naphthol is added, is not softened immediately, but requires time and usually an increased temperature. If the milling operation is extended over sufficient time at a sufficiently elevated temperature, considerable softening may result, due to the action of the nitroso-body during the milling operation. However, in order that the full benefit be obtained, it is necessary to store the rubber for an extended time or for a shorter length of time at an elevated temperature.

W preferably employ from about 0.05 to about 0.8% of alpha-nitroso-beta-naphthol based on the rubber. Substantially less than about 0.05% produces insufficient effect to be of value. The alpha-nitroso-beta-naphthol is soluble in rubber, under ordinary conditions, to the extent of only about 0.8%. When as much as 1% of alpha-nitroso-beta-naphthol is milled into rubber and the mixture is allowed to stand, part of the nitroso compound will bloom to the surface of the rubber, except when the mixture is heated at high temperatures for extended periods of time so as to cause the nitroso compound to react with the rubber as described by Fisher in his Patent No.

2,035,698. Further, the plasticity obtained will increase rapidly in substantial proportion to the amount of alpha-nitroso-beta-naphthol employed up to about 0.8%. Substantial increase in the amount of alpha-nitroso-beta-naphthol above about 0.8% produces but little increase in plasticity over the use of about 0.8%.

Further, if more than 1% of alpha-nitroso-beta-naphthol is employed, a product having a high tack will be produced on heating the mixture at the higher temperatures employed by Fisher, as disclosed in his patent before referred to. However, if only about 0.05 to about 0.8% of alpha-nitroso-beta-naphthol is employed, the rubber will be effectively plasticized, but will not be given a high tack even at temperatures as high as 140° C.; that is, the product will not be substantially more tacky than if it were subjected to the same conditions in the absence of the alpha-nitroso-beta-naphthol. Accordingly, when we refer to a "substantially non-tacky" product herein and in the claims, it will be understood that we mean a product which is not noticeably more tacky than would be obtained by subjecting the rubber to the same conditions in the absence of added nitroso compound.

In order to more clearly illustrate our invention, the preferred modes of carrying the same into effect and the advantageous results to be obtained thereby, the following examples are given:

Example I 1500 grams of smoked sheet rubber were placed on an 18 inch laboratory mill heated to 100° C. After two minutes, the rubber was treated with alpha-nitroso-beta-naphthol and the milling was continued for three minutes. Portions of the rubber were held under various conditions of storage. The plasticity changes were followed by means of a parallel plate plastometer which measured the thickness in inches of a 2 ccm. pellet of rubber after being in the plastometer for five minutes at 70° C. The recovery, which is a measure of the nerve of the rubber, was determined by quickly pressing a 2 ccm. pellet of rubber at 70° C. to a thickness of 3 mm. and measuring the thickness in inches to which the pellet returned after 15 seconds. The results in Table I show the rubber containing alpha-nitroso-beta-naphthol to flow more easily than the control and to retain the deformation to a greater extent.

*Table I*

| Amount of alpha-nitroso-beta-naphthol, condition of storage | | 0 | | .5% | | .25% | | .15% | |
|---|---|---|---|---|---|---|---|---|---|
| Hours | Temperature, °C. | Plasticity | Recovery | Plasticity | Recovery | Plasticity | Recovery | Plasticity | Recovery |
| 2 | 25 | .190 | .320 | .145 | .242 | .185 | .298 | --- | --- |
| 20 | 25 | .192 | .317 | .141 | .240 | .160 | .300 | --- | --- |
| 120 | 25 | .192 | .320 | .122 | .204 | --- | --- | .188 | .320 |
| 20 | 70 | .194 | .295 | .079 | .060 | .134 | .219 | .149 | .300 |
| 5 | 100 | .188 | .305 | .068 | .047 | .108 | .106 | .125 | .191 |
| 1 | 130 | .190 | .315 | .118 | .151 | --- | --- | --- | --- |

No difference in the tack of the portions of rubber containing no nitroso compound and those portions which contained nitroso compound was detected.

Example II

Smoked sheet rubber was compounded with 3% of sulfur and 0.5% of alpha-nitroso-beta-naphthol on a laboratory mill heated to 100° C. A control stock was milled which contained sulfur but no nitroso-beta-naphthol. The plasticity and recovery were followed as in Example I, with the results shown in Table II:

*Table II*

| Conditions of storage | | Control stock | | Stock softened with alpha-nitroso-beta-naphthol | |
|---|---|---|---|---|---|
| Hours | Temperature, °C. | Plasticity | Recovery | Plasticity | Recovery |
| 3 | 25 | .179 | .320 | .149 | .302 |
| 72 | 70 | .181 | .335 | .089 | .115 |
| 11 | 100 | .179 | .325 | .086 | .180 |

Example III

Smoked sheet rubber was placed on a laboratory mill heated to 100° C. and compounded with 30% of its weight of carbon black and 0.5% of alpha-nitroso-beta-naphthol. A control stock, which contained carbon black but no nitroso-beta-naphthol, was also milled. The plasticity and recovery were followed as in Example I, with the results shown in Table III.

*Table III*

| Conditions of storage | | Control stock | | Stock softened with alpha-nitroso-beta-naphthol | |
|---|---|---|---|---|---|
| Hours | Temperature, °C. | Plasticity | Recovery | Plasticity | Recovery |
| 24 | 25 | .269 | .280 | .220 | .265 |
| 20 | 70 | .295 | .207 | .221 | .235 |
| 5 | 100 | .300 | .280 | .191 | .205 |

Example IV

1% of alpha-nitroso-beta-naphthol on the rubber content was added to 50% rubber latex and the latex coagulated with acetic acid. The coagulum contained about 0.8% of alpha-nitroso-beta-naphthol. A similar lot of latex which contained no nitroso-beta-naphthol was coagulated in the same manner. Each lot of rubber was sheeted out on a corrugated mill and heated for 24 hours at 70° C. At the end of this time each sample of rubber was dry. The sample containing alpha-nitroso-beta-naphthol was sufficiently soft to flow together in the drying pan while the control was firm. No difference in the tack of the two dry samples was detected.

Various other methods of softening with alpha-nitroso-beta-naphthol may be employed. Smoked sheet rubber is readily softened by heating in a saturated water solution of the nitroso body. Similarly, the rubber in latex may be softened by heating the latex after the addition of the nitroso compound.

Alpha-nitroso-beta-naphthol may also be employed to produce rubber cements of high rubber content and low viscosity. The alpha-nitroso-beta-naphthol may be added to a solution of the rubber, whereupon the compound will act upon the rubber in the solution to greatly decrease the viscosity of the rubber solution. It will generally be preferred to add the nitroso body to the rubber before solution of the rubber in the solvent or to the solvent prior to the solution of the rubber therein. By these last two methods the solution of the rubber in the solvent will be greatly expedited.

Basic material interferes with the softening of rubber by alpha-nitroso-beta-naphthol. Rubber containing sufficient zinc oxide or other neutralizing agent to neutralize the free acids naturally contained in rubber is not softened by the addition of the sodium or other neutral salt of alpha-nitroso-beta-naphthol. On the other hand, if sufficient of basic material is not present to neutralize the free acids these acids will react with the salt of alpha-nitroso-beta-naphthol to release alpha-nitroso-beta-naphthol therefrom which will thereupon act upon the rubber to produce the softening effect. Accordingly, it is necessary, in order for the alpha-nitroso-beta-naphthol to exert its softening effect on the rubber, that the compositions contain insufficient amounts of a neutralizing material to neutralize the alpha-nitroso-beta-naphthol.

Advantage of this difference in activity of alpha-nitroso-beta-naphthol and its salts may be availed of to control the softening action. For example, the rubber may be subjected to the action of the alpha-nitroso-beta-naphthol until a certain desired degree of plasticity or viscosity is obtained and then a neutralizing agent may be added to prevent or retard further action of the alpha-nitroso-beta-naphthol. Also, salts of the alpha-nitroso-beta-naphthol may be added to the rubber or the alpha-nitroso-beta-naphthol may be added to rubber containing considerable quantities of neutralizing agents and at any time thereafter an acid material such as stearic acid may be added to liberate free alpha-nitroso-beta-naphthol to soften the rubber. Thus, it is possible to control the time at which the softening is to take place and the degree of softening desired without it being necessary to carefully control the amount of alpha-nitroso-beta-naphthol added to the rubber. Accordingly, when alpha-nitroso-beta-naphthol is referred to in the claims, we refer to the free compound as distinguished from its salts or other derivatives and whether the alpha-nitroso-beta-naphthol is added to the rubber as such or as a salt or other derivative and subsequently liberated in the free state by means of acid and the like.

This action of alpha-nitroso-beta-naphthol to plasticize rubber appears to be specific to this compound. Many other nitroso compounds have been tested for this purpose but none of them plasticized the rubber to an extent which would render them practicable for use for our purpose. This is further evidence that our invention is different from that of Fisher described in his patent 2,035,698. Fisher discloses that he may use neutral compounds and salts for his purpose. As has been heretofore pointed out, alpha-nitroso-beta-naphthol must be used as the free compound and in the substantial absence of neutralizing materials to be effective for our purpose. This still further differentiates our invention from that of Fisher.

By the phrase "decreasing the resistance of the rubber to flow" we mean to include decrease in viscosity of a rubber cement as well as increase in plasticity of ordinary unvulcanized rubber in the more or less solid state.

This is in part a continuation of our earlier application Serial No. 60,064, filed January 21, 1936, for "Plasticizing rubber."

While we have disclosed the preferred embodiments of our invention, it will be readily apparent to those skilled in the art that many changes and variations may be made therein without departing from the spirit of our invention. Accordingly, the scope of our invention is to be limited solely by the appended claims construed as broadly as is permissible in view of the prior art.

We claim:

1. The method of producing substantially non-tacky unvulcanized rubber of decreased resistance to flow which comprises subjecting the unvulcanized rubber to the action of about 0.05 to about 0.8% of alpha-nitroso-beta-naphthol in the absence of sufficient amounts of a neutralizing material to neutralize the alpha-nitroso-beta-naphthol and for a sufficient length of time for said alpha-nitroso-beta-naphthol to effect a marked decrease in the resistance to flow of the rubber over that which the rubber would have if subjected to the same conditions in the absence of said alpha-nitroso-beta-naphthol.

2. The method of producing substantially non-tacky unvulcanized rubber of decreased resistance to flow which comprises subjecting the unvulcanized rubber to the action of about 0.05 to about 0.8% of nitroso-beta-naphthol for a sufficient length of time for said alpha-nitroso-beta-naphthol to effect a marked decrease in the resistance to flow of the rubber over that which the rubber would have if subjected to the same conditions in the absence of said alpha-nitroso-beta-naphthol, prior to the addition of compounding ingredients to the rubber.

3. The method of reducing the viscosity of solutions of unvulcanized rubber without substantially increasing the tackiness of the rubber which comprises incorporating in the solution about 0.05 to about 0.8% of alpha-nitroso-beta-naphthol based on the rubber in the absence of sufficient amounts of a neutralizing material to neutralize the alpha-nitroso-beta-naphthol.

4. The method of reducing the viscosity of solutions of unvulcanized rubber without substantially increasing the tackiness of the rubber which comprises incorporating about 0.05 to about 0.8% of alpha-nitroso-beta-naphthol into the unvulcanized rubber before dissolving the rubber in the solvent, the alpha-nitroso-beta-naphthol being maintained in unneutralized state until it has acted on the rubber to the desired extent.

5. The method of reducing the viscosity of solutions of unvulcanized rubber without substantially increasing the tackiness of the rubber which comprises incorporating about 0.05 to about 0.8% of alpha-nitroso-beta-naphthol in the solvent before dissolving the rubber therein, maintaining the rubber and the solvent free of sufficient amounts of a neutralizing material to neutralize the alpha-nitroso-beta-naphthol until the desired reduction in viscosity is obtained.

6. Substantially non-tacky unvulcanized rubber of decreased resistance to flow as made by the process of claim 1.

7. Solutions of substantially non-tacky unvulcanized rubber of reduced viscosities as made by the process of claim 3.

8. The method of producing substantially non-tacky unvulcanized rubber of decreased resistance to flow which comprises incorporating about 0.05 to about 0.8% of alpha-nitroso-beta-naphthol in the rubber in the absence of sufficient amounts of a neutralizing material to neutralize the alpha-nitroso-beta-naphthol and then aging the rubber for a sufficient length of time for said alpha-nitroso-beta-naphthol to effect a decrease in the resistance of the rubber to flow.

IRA WILLIAMS.
CARROLL CUMMINGS SMITH.